(12) United States Patent
Lange

(10) Patent No.: US 7,201,429 B1
(45) Date of Patent: Apr. 10, 2007

(54) IMPACT ACTUATED ANIMAL DEFLECTOR SYSTEM

(76) Inventor: Nancy Erin Lange, 108 N. Walnut St., Maquoketa, IA (US) 52060

( * ) Notice: Subject to any disclaimer, the term of this patent is extended or adjusted under 35 U.S.C. 154(b) by 0 days.

(21) Appl. No.: 11/226,764

(22) Filed: Sep. 14, 2005

(51) Int. Cl.
*B60R 19/52* (2006.01)

(52) U.S. Cl. ............................ 296/115; 280/770

(58) Field of Classification Search .................. 293/38, 293/39, 114, 118, 129, 131, 132, 133, 138, 293/139, 140, 115, 142, 143, 144, 145, 146, 293/147, 148, 152, 153, 154, 155; 224/490; 52/633; D12/171, 170; 166/89.17; 280/770
See application file for complete search history.

(56) References Cited

U.S. PATENT DOCUMENTS

| | | | | |
|---|---|---|---|---|
| 1,293,224 A | * | 2/1919 | Smith | 293/44 |
| 4,213,645 A | * | 7/1980 | Ruhl | 293/145 |
| 4,469,360 A | * | 9/1984 | Drury | 293/102 |
| 4,570,367 A | | 2/1986 | Oya | |
| 4,641,871 A | * | 2/1987 | Vaughn | 293/118 |
| 6,676,180 B1 | * | 1/2004 | Houseman et al. | 293/115 |
| 6,682,111 B1 | * | 1/2004 | Houseman et al. | 293/115 |
| 6,908,128 B2 | * | 6/2005 | Strong | 293/128 |

* cited by examiner

*Primary Examiner*—Lori L. Coletta
(74) *Attorney, Agent, or Firm*—Sturm & Fix LLP

(57) ABSTRACT

An animal deflector system for propelling a deer/large animal away from the front portion of a moving vehicle wherein the system includes a brush guard member mounted on the front of a vehicle by a pair of compression springs connect on one end to the brush guard member and a pair of bearing plates affixed to the front of the vehicle, wherein a pair of pivotal lever members maintain the compression springs in a pre-loaded condition until a deer/large animal forcibly impacts the brush guard member.

7 Claims, 2 Drawing Sheets

IMPACT ACTUATED ANIMAL DEFLECTOR SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of brush guards in general, and in particular to a spring loaded brush guard that is actuated by impact with the body of an animal.

2. Description of Related Art

As can be seen by reference to the following U.S. Pat. Nos. 1,293,224; 4,213,645; 4,469,360; 4,570,367; 6,682,111 and 6,676,180, the prior art is replete with myriad and diverse brush guards, cow catchers, and other arrangements designed to protect the front of a moving vehicle.

While all of the aforementioned prior art constructions are more than adequate for the basic purpose and function for which they have been specifically designed, they are uniformly deficient with respect to their failure to provide a simple, efficient, and practical device that employs stored energy to propel an animal away from the path of a moving vehicle to minimize potential damage to the vehicle proper and/or its occupants.

Recently, many suburban areas have been experiencing a rash of deer/vehicle collisions involving both extensive damage to the vehicle bodies as well as injuries that are sometimes fatal to the occupants of the vehicle.

As a consequence of the foregoing situation, there has existed a longstanding need among motorists for a new and improved type of brush guard that is capable of propelling a deer or other large animal out of the path of a moving vehicle using stored energy, and the provision of such an arrangement is a stated objective of the present invention.

BRIEF SUMMARY OF THE INVENTION

Briefly stated, the present invention provides an impact actuated animal deflector system that forms the basis of the present invention comprises in general a deflector unit, a stored energy unit, and a release unit that maintains the deflector unit in a retracted position whereupon a physical impact of a certain magnitude will cause the release unit to be disengaged from the stored energy unit which will propel the deflector unit in the direction of travel of the moving vehicle.

As will be explained in greater detail further on in the specification, the deflector unit comprises in general a reinforced brush guard member which is movably disposed relative to the front of a vehicle chassis.

In addition, the stored energy unit comprises a compressed spring member that is interposed between the brush guard member and the vehicle chassis, wherein the compressed spring member is pre-loaded by external forces and normally held in place by the release unit.

Furthermore, the release unit comprises a pivoted release member that is normally spring biased into the "release" position but which is overcome by the force of the compressed spring member until such time as an impact of a certain magnitude will further compress the compressed spring member to allow the spring biased release member to be disengaged from the brush guard member allowing the brush guard member to be propelled forwardly in the direction of travel of the vehicle chassis.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 3:
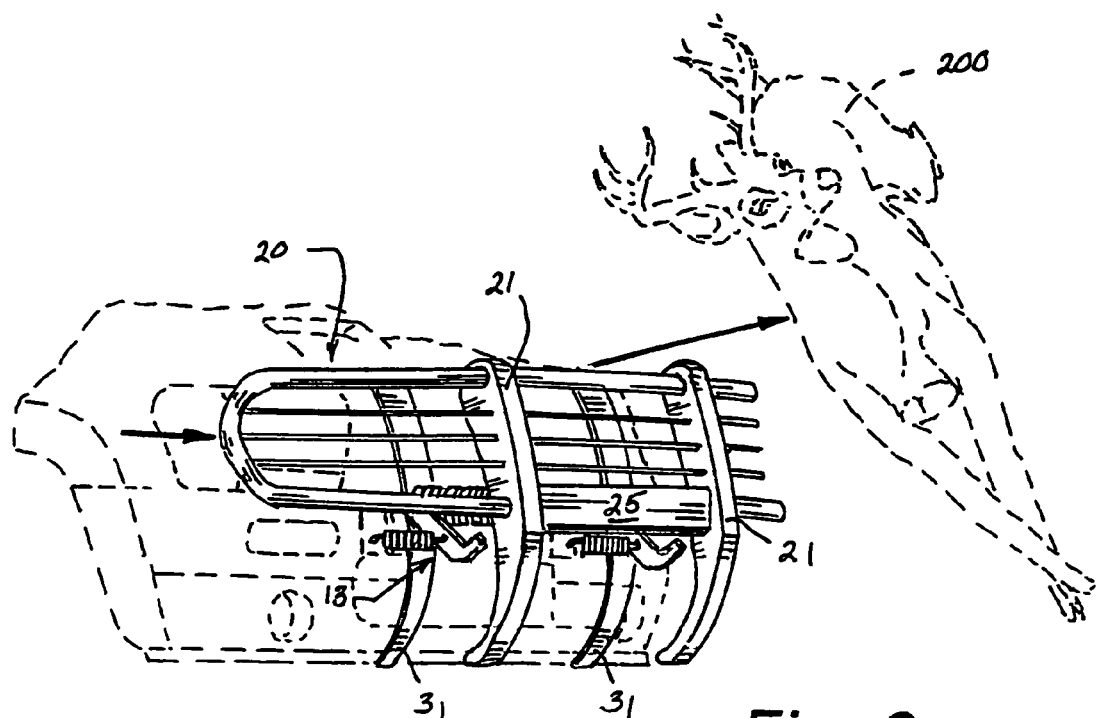
FIG. 3 is a perspective view of the deflector system a fraction of a second after impact.

As can be seen by reference to the drawings, and in particularly to FIG. 3, the impact actuated animal deflector system that forms the basis of the present invention is designated generally by the reference number (10). The deflector system (10) comprises in general a deflector unit (11), a stored energy unit (12) and a release unit (13). These units will now be described in seriatim fashion.

Figure 5:
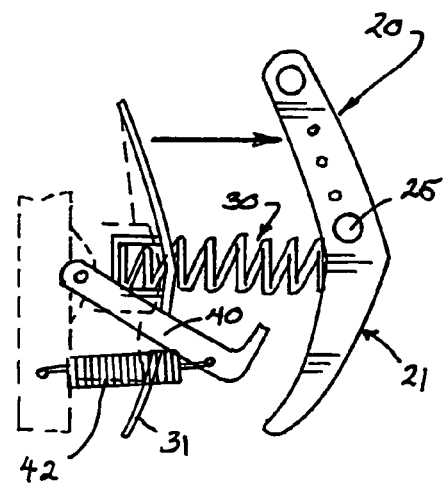
FIG. 5 is a cross-sectional view showing the structural units in their immediate post-impact orientation.

As can best be appreciated by reference to FIGS. 3 and 5, the deflector unit (11) comprises a brush guard member (20) having a pair of vertical braces (21) that support rigid framework (22) having a plurality of horizontal support rods (23) that define an outer grillwork that is disposed above the front bumper (101) of a vehicle.

In addition, the brush guard member (20) is further provided with a reinforced cross-brace (25) that extends between the pair of vertical braces (21), wherein the cross-brace (25) forms a bearing surface for the stored energy unit (12), and a point of engagement for the release unit (13) as will be explained presently.

Figure 4:
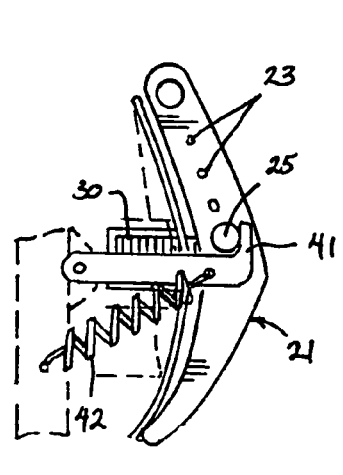
FIG. 4 is a cross-sectional view showing the structural units in their pre-loaded orientation.

Turning now to FIGS. 3 through 5, it can be seen that the stored energy unit (12) comprises a pair of compression spring members (30) each having one end mounted on one of a pair of bearing plates (31) each fixedly secured to the front of the vehicle framework, wherein the other end of each compression spring (30) is fixedly secured to one of the vertical braces (21) of the brush guard member (20).

As can also be seen by reference to FIGS. 3 through 5, the release unit (13) comprises a pair of release lever members (40) each having one end pivotally secured to one of the bearing plates (31) wherein the free end of each lower member (40) has a hooked portion (41) that releasably engages a portion of the cross brace (25) of the brush guard member (20).

In addition, the release unit (13) further includes a pair of tension springs (42) each having one end attached to one of the bearing plates (31), wherein the other end of each of the tension springs (42) is attached proximate to the free end of one of the lever members (40).

Furthermore, as can best be seen by reference to FIG. 5, the compression springs (30) are substantially stronger than the tension springs (42) and the reason for that different will be explained next.

Figure 1:
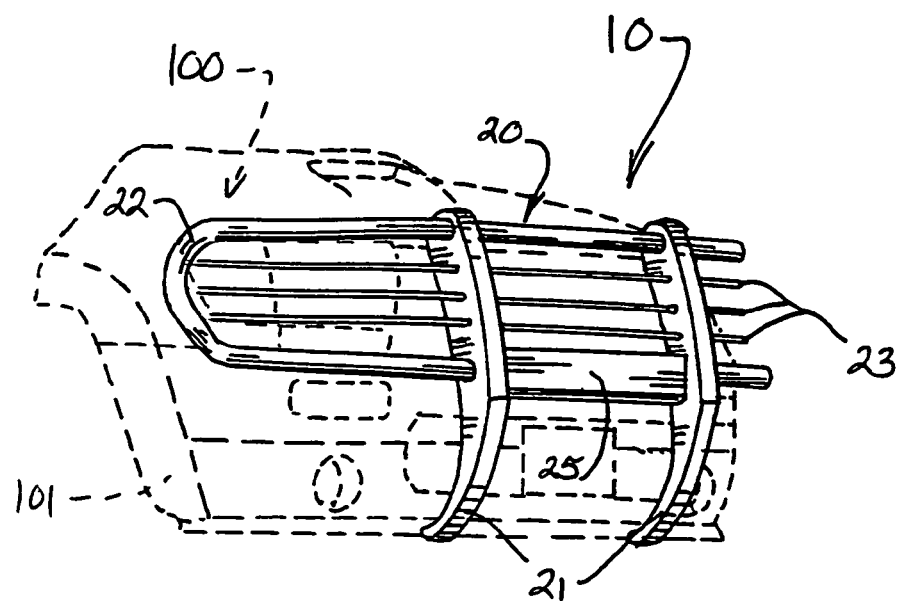
FIG. 1 is a perspective view of the animal deflector system at rest.
Figure 2:
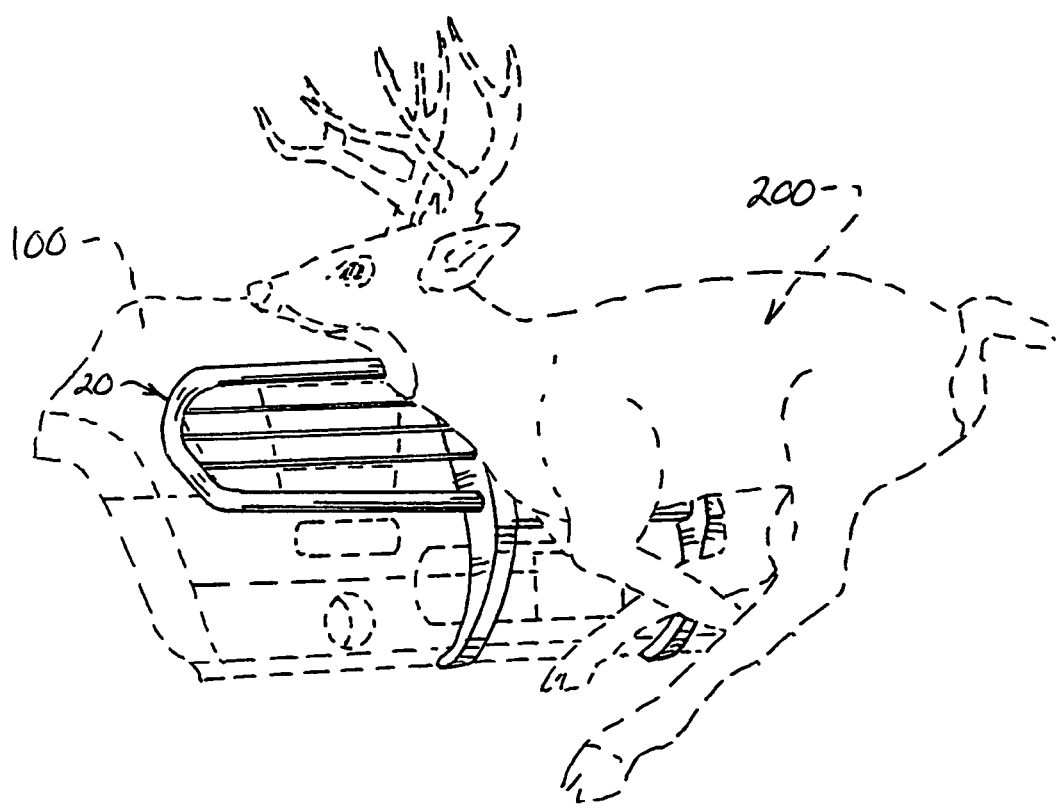
FIG. 2 is a perspective view of the deflector system immediately prior to impact with an animal.

As shown in FIGS. 1 through 3, the deer deflector system (10) of this invention must first be pre-loaded once it is installed on the front of a vehicle (100), such that the compression spring (30) is substantially but not fully compressed when the hooked portion (41) of the lever arm (40) is engaged with the cross brace (25) to place the brush guard member (20) in its "cocked and loaded" disposition. It is to be understood that this "pre-loading" is accomplished by an authorized mechanic or the like.

When the brush guard member (20) experiences a forceful impact, such as would be generated by the moving vehicle (100) striking a deer (200), the compression springs (30) will be momentarily fully compressed allowing the tension springs (42) to disengage the hooked portions (41) of the lever arms (40) from the cross brace (25), whereupon the compression springs (30) will propel the brush guard member (20) against the deer (200) out of the path of the moving vehicle (100).

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooded parts together, whereas, a screw employs a helical surface, in the environment of fastening wooden parts, a nail and a screw may be equivalent structures.

Having hereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. An animal deflector system for propelling an animal out of the path of a front portion of a moving vehicle, wherein the deflector system comprises:
    a deflector unit including a brush guard member operatively and movably associated with the front portion of the vehicle;
    energy storage means disposed intermediate the brush guard member and the front portion of the vehicle, wherein said energy storage means is disposed in a pre-loaded disposition, wherein said energy storage means comprises at least one compression spring; and
    means for releasing said energy storage means to cause the brush guard member to rapidly move away from the front portion of said vehicle.

2. The system as in claim 1, wherein said means for releasing said energy storage means comprises at least one lever member having one end pivotally associated with the front portion of said vehicle, wherein the at least one lever member has a free end provided with a hooked portion that is adapted to releasably engage a selected portion of the brush guard member.

3. The system as in claim 1, wherein said brush guard member includes a pair of vertical braces connected to one another by a cross-brace, wherein said pair of vertical braces further support a rigid framework that at least partially defines an outer grillwork.

4. The system as in claim 3, wherein said energy storage means comprises:
    a pair of compression springs and a pair of bearing plates wherein the bearing plates are fixedly secured to the front portion of said vehicle and the compression springs have one end connect to one of the bearing plates and the other end connected to one of the vertical braces of the brush guard member.

5. The system as in claim 4, wherein said means for releasing said energy storage means comprises:
    a pair of lever members each having one end pivotally associated with one of the bearing plates and having the other end provided with a hook portion adapted to releasably engage a selected portion of the brush guard member.

6. The system of claim 5, wherein said means for releasing said energy storage means further comprises:
    a pair of tension springs wherein each tension spring is operatively connected between one of the bearing plates and the hook portion of one of the lever members.

7. A method of deflecting an animal from a front portion of a vehicle, the method comprising:
    operatively mounting a brush guard to the front portion of the vehicles;
    forcing the brush guard to move away from the front portion of the vehicle upon impact of an object to a front of the brush guard by applying a force in a forward direction to the brush guard with a spring;
    providing a force to the brush guard away from the front portion of the vehicle; and
    restraining the brush guard from moving away from the front portion of the vehicle due to the force until the object impacts the front of the brush guard.

* * * * *